Patented Feb. 20, 1945

2,369,757

UNITED STATES PATENT OFFICE 2,369,757

BLEACHING PROCESS FOR FLUIDS

Heinrich Schmidt, Niedercunnersdorf, Germany; vested in the Alien Property Custodian No Drawing. Application September 28, 1940, Serial No. 358,942. In Germany January 9, 1939

7 Claims. (Cl. 127—46)

This invention relates to processes for bleaching or reducing the discoloration of liquids and juices or the like with the aid of hydrogen peroxide.

Basically considered, these processes involve bleaching or decoloring liquids by treating them with hydrogen peroxide vapor. Heretofore prior art bleaching processes wherein hydrogen peroxide was used were operated at reaction conditions at which the hydrogen peroxide was in liquid form, that is the bleaching or decoloring was carried out by simply adding a quantity of hydrogen peroxide to the liquid to be bleached. Although the prior art processes seem satisfactory, simple and fool-proof, they have proven to be unsatisfactory in some cases, particularly in the decoloring of sugar juices before they are concentrated, and in the bleaching of table oils and fats. The particular difficulty in these cases is that the substances are sensitive and that the resulting product must be peroxide free. Since it is impossible to gauge accurately the amount needed, the excess must be removed by resorting to a further processing. Prior workers have also proposed to decolor liquids with the aid of gaseous sulfurous acid, chlorine or ozone as well as to treat solids with gas-forming hydrogen peroxide.

In accordance with a preferred embodiment of this invention, liquids, such as sugar juices and table oils, are bleached or decolored by treating them with vaporous hydrogen peroxide. The reaction conditions are such that the process may be carried out in the form of a continuous reaction. It is merely essential that the treatment be carried out in an apparatus which will permit the liquid to be treated to be in the apparatus in an agitated state so as to cause a proportionately large surface area of the liquid to be exposed to vapors containing hydrogen peroxide which are simultaneously present in the apparatus.

In carrying out the process of my invention, it is preferably advisable to make use of apparatus which will permit the use of a continuous process. For example, it is preferable to make use of a spray tower or other tower into which the liquid to be bleached can be introduced at the top and made to pass downwardly therethrough in thin agitated layers which are in contact with vaporous peroxide flowing in countercurrent. A continuous process of this latter type is susceptible of ready control of the degree of bleaching. This control may be exercised by varying the construction of the apparatus itself, that is, by changing the length of the route taken by the material to be bleached. This may be done in any number of ways, for example, by varying the length of the tower, varying the amount and type of fillers (Raschig rings, plates, etc.) or by the variation of corresponding built in irrigation surfaces.

The control of the bleaching process may also be affected by other means, for example, by the presence of various catalysts in the tower for example: rings, plates, etc., with surfaces made of metals or chemicals which are catalysts for $H_2O_2$ (Fe, Ni, Co, Mn, Ag, Pt, $MnO_2$, $Co_2O_3$, $Fe_2O_3$, etc.) and/or adding such chemicals ($Co(NO_3)_2$, $CoSO_4$, $CuSO_4$, $NiSO_4$, $Fe(NO_3)_2$ etc.) in small parts to the liquid to be bleached, by the respective concentrations of the liquids to be bleached and of the bleaching agent present, by varying the speeds at which the material to be bleached passes through the tower and by regulating the temperatures of the tower, of the material to be bleached and of the bleaching agent. The reaction may also be influenced by pressure conditions in the apparatus. However, although either superatmospheric or subatmospheric pressures are preferably used, the process may also be carried out at normal pressures.

The temperature conditions may be varied over a wide range. For example, in another preferred embodiment of my invention, the temperatures of the various mediums may be regulated in such manner that a fractional condensation of the bleaching agent on thin layers of bleaching material takes place in the upper portion of the tower, while the temperatures of the lower portion of the tower and the mediums are so regulated that any excess in bleaching agent present in the material to be decolored is again vaporized therefrom in the lower portion of the tower. It is thereby possible to have the bleaching agent react in liquid form on the material to be bleached during the first step of the process regardless of the concentration of the vapors while the previously condensed excess of bleaching agent which reaches the lower portion of the tower vaporizes therefrom and increases the concentration of the bleaching vapor entering the apparatus. This process guarantees a dependable and rational execution of the decoloring process even in the most difficult cases.

It has been found that by using this process even very sensitive liquids, such as table oils, liquid fats, and the like, may be bleached without harm because only enough peroxide is withdrawn from the bleaching vapors as is required to decolor or bleach the material.

It is therefore possible, by adjusting the reaction conditions in the apparatus, to take care of maximum discoloration, to use this process to decolor satisfactorily sensitive liquids whose discoloration may vary over a wide range. For example, it is possible by using this process to decolor satisfactorily thickened sugar juices which leave the boilers with all shades of discoloration.

The bleaching agent, which is introduced into the bottom of the apparatus and passes up in countercurrent and reaches the top of the tower, may be withdrawn therefrom by suction or some other suitable means, accumulated and used again after its concentration has been brought up to that of the bleaching vapor initially introduced into the tower. In this manner, it is possible to carry out the process in a rapid, satisfactory, economic matter without loss of bleaching agent, and without harm to the materials bleached.

It will be understood that the embodiments of my invention described in this specification are only specific examples of the processes utilizing the principles of the invention. It is therefore desirable that the invention be interpreted broadly within the scope and spirit thereof, and limited only by the claims appended hereto.

I claim:

1. In a process for decoloring liquid with hydrogen peroxide, the steps comprising introducing the liquid to be decolored into a tower provided with means causing the liquid to pass therethrough in thin layers, introducing a vaporous hydrogen peroxide bleaching agent into said tower, causing the bleaching agent to flow in countercurrent to said liquid to be bleached and come into intimate contact therewith, and maintaining a temperature gradient within said tower such that the temperature of the liquid and the bleaching agent near the point of introduction of the liquid is below the vaporization temperature of the bleaching agent and such that the temperature of the liquid and the bleaching agent near the point of introduction of the bleaching agent is above said vaporization temperature.

2. In a process for decoloring liquid with hydrogen peroxide, the steps comprising introducing the liquid to be decolored into the top of a contact tower, distributing the liquid so introduced into a plurality of downwardly flowing small streams with the liquid in continual motion and circulation within itself, subjecting the downwardly flowing liquid in the presence of metal catalysts to the action of streams of rising hydrogen peroxide vapors, and maintaining a temperature gradient within said tower such that the temperature of the liquid and the bleaching agent near the point of introduction of the liquid is below the vaporization temperature of the bleaching agent and such that the temperature of the liquid and the bleaching agent near the point of introduction of the bleaching agent is above said vaporization temperature.

3. In a process for decoloring liquid with hydrogen peroxide, the steps comprising introducing the liquid to be decolored into one end of an extended contact zone, distributing the liquid so introduced into a plurality of downwardly flowing thin streams, introducing hydrogen peroxide vapor into the other end of said zone, causing the vapor to flow in countercurrent relation to the downwardly flowing liquid streams and in intimate contact therewith, fractionally condensing the peroxide vapor into contact with the liquid in the upper portion of said zone, and revaporizing hydrogen peroxide from the liquid in the lower portion of said zone.

4. In a process for decoloring liquid with hydrogen peroxide, the steps comprising introducing the liquid to be decolored into the top of a contact tower, distributing the liquid so introduced into a plurality of downwardly flowing small streams with the liquid in continual motion and circulation within itself, introducing hydrogen peroxide vapors into the bottom of the tower at a temperature higher than that at which the liquid is maintained at the top, said hydrogen peroxide being progressively cooled as it rises through the mass to the top, the temperature maintained at the bottom of said tower causing evaporation of peroxide from the liquid before it leaves the tower, and the temperature maintained near the upper end of the tower at the point of entrance of the liquid lying substantially below the boiling point of hydrogen peroxide thereby causing peroxide vapor to condense into contact with the liquid to be decolored.

5. In a process for decoloring liquid with hydrogen peroxide, the steps comprising introducing the liquid to be decolored into the top of a contact tower provided with contact surfaces made of peroxide catalysts, distributing the liquid so introduced into a plurality of downwardly flowing small streams with the liquid in continual motion, introducing a peroxide vapor bleaching agent into the bottom of the tower, flowing the bleaching agent in countercurrent and in intimate contact with the moving layers of liquid, and regulating the temperatures of the contacting liquid and vapor in the tower to cause the highest temperature zone to be in the lower portion of the tower and the lowest temperature zone to be in the upper portion of the tower, said highest temperature zone being such that peroxide is evaporated from the liquid passing therethrough by vaporization, and said lowest temperature being sufficiently low to permit at least partial condensation of peroxide bleaching agent into contact with the liquid to be decolored.

6. In a process for decoloring sugar juices with hydrogen peroxide, the steps comprising introducing the sugar juices into a tower provided with means causing the sugar juices to pass therethrough in thin layers, introducing vaporous hydrogen peroxide into said tower, causing the hydrogen peroxide to flow in countercurrent relation to said sugar juices to be bleached and in intimate contact therewith, and maintaining a temperature gradient within said tower such that the temperature of the sugar juices and the hydrogen peroxide vapors near the point of introduction of the sugar juices is below the vaporization temperature of the hydrogen peroxide and such that the temperature of the sugar juices and the hydrogen peroxide near the point of introduction of the hydrogen peroxide is above the vaporization temperature of the hydrogen peroxide.

7. In a process for decoloring edible oils with hydrogen peroxide, the steps comprising introducing the edible oil to be decolored into one end of an extended contact zone, distributing the oil so introduced into a plurality of thin streams, introducing hydrogen peroxide vapor into the other end of said zone, causing the hydrogen peroxide vapor to flow in a countercurrent relation to the flow of said thin streams of oil while maintaining a temperature gradient within said contact zone such that condensation of hydrogen peroxide into contact with the edible oil takes place near the point of its introduction and such that condensed hydrogen peroxide is removed from the edible oil before said oil passes out of said contact zone.

HEINRICH SCHMIDT.